United States Patent
Gillingham et al.

(10) Patent No.: US 7,388,724 B2
(45) Date of Patent: Jun. 17, 2008

(54) PULSE-SLIMMING FOR A TAPE SERVO SYSTEM USING NON-LINEAR GAIN

(75) Inventors: Ronald D. Gillingham, Loveland, CO (US); Steven G. Trabert, Boulder, CO (US); Forest K. Dillinger, Golden, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 74 days.

(21) Appl. No.: 11/424,663

(22) Filed: Jun. 16, 2006

(65) Prior Publication Data

US 2007/0291403 A1    Dec. 20, 2007

(51) Int. Cl.
*G11B 5/09* (2006.01)
*G11B 5/596* (2006.01)

(52) U.S. Cl. .................. 360/39; 360/77.12
(58) Field of Classification Search .......... None
See application file for complete search history.

(56) References Cited

U.S. PATENT DOCUMENTS

| | | | |
|---|---|---|---|
| 4,151,594 A * | 4/1979 | Stern ............... | 242/421.1 |
| 4,167,763 A * | 9/1979 | Kubota ............ | 360/77.16 |
| 5,315,168 A * | 5/1994 | Norton, Jr. ....... | 327/58 |
| 6,347,019 B1 * | 2/2002 | Gregg ............. | 360/78.04 |
| 6,429,995 B1 * | 8/2002 | Dobbek et al. ... | 360/77.08 |

* cited by examiner

*Primary Examiner*—K. Wong
(74) *Attorney, Agent, or Firm*—William J. Kubida; Michael C. Martensen; Hogan & Hartson LLP

(57) ABSTRACT

Pulses generated from servo stripes of a servo tape system are narrowed by using non-linear gain enabling precise position of the read head. Non-linear gain based on the amplitude of each pulse is applied to each pulse to reduce jitter and distortion so as to more accurately position the read head. A non-linear gain device comprising multipliers apply a non-linear gain to a normal servo pulse signal prior, in one embodiment, to the signal being applied to a qualifier. The non-linear gain device further comprises a limiter so as to limit the gain beyond a certain threshold to 1.0. The limitation of the gain to 1.0 renders the actual amplitude of the pulse unchanged while narrowing the pulse and flattening the baseline. The resulting pulse possesses less jitter and less distortion qualities rendering the positioning of the read head more precise.

20 Claims, 12 Drawing Sheets

PULSE-SLIMMING FOR A TAPE SERVO SYSTEM USING NON-LINEAR GAIN

BACKGROUND OF THE INVENTION

1. Field of the Invention

The present invention relates, in general, to linear tape systems, and, more particularly, to systems and methods for slimming tape servo pulses using non-linear gain.

2. Relevant Background

Because of its relatively low cost, linear tape is commonly used as a medium for storing large amounts of digital data for archival purposes. For example, disk-based memory is often archived on linear data storage tape. Data is formatted on linear tapes in a plurality of tracks that extend longitudinally along the tape. A tape head is moveable laterally across the tape to read or write different tracks. In many cases, multiple tracks can be written or read at the same time by using a tape head with multiple read/write elements. When reading or writing a linear data storage tape, accurate lateral positioning of the tape head is very important. To achieve such accuracy, servo stripes are prewritten on the tape. The servo stripes are detected by the tape head during reading and writing to determine the exact lateral position of the tape head relative to the linear tape.

FIG. 1 illustrates, conceptually, the use of servo stripes. FIG. 1 shows a segment of a linear tape 100 that extends in a longitudinal direction x, and that has a lateral dimension y. The tape includes a plurality of servo stripes 120. In the simplified example of FIG. 1, there are three servo stripes. The servo stripes are written to the tape during a preparatory "formatting" process, prior to actual use of the tape for data storage. The servo stripes are spaced laterally from each other by a specified distance. Data tracks 140 are located between the servo stripes. The lateral positions of the data tracks are specified relative to the servo stripes. When reading or writing on a tape 100, a tape head senses the servo stripes with servo read elements and positions itself precisely relative to the servo stripes. Within the tape head, data read/write elements are spaced relative to the servo read elements so that the data read/write elements will be positioned over data tracks 140 when the servo read elements are positioned accurately over the corresponding servo stripes 120.

There are different ways to derive lateral position information from a servo stripe. One common way is to divide a servo stripe into two half stripes, which are recorded with different information (such as two distinct frequencies or bursts occurring at distinct times). A single servo head straddles the boundary between the half stripes, and position information is obtained by comparing the amplitude or phase responses of the signals generated from the respective half stripes.

FIG. 2 shows an example of a servo pattern, as is known in the prior art, using a continuously-variable, timing-based servo pattern, along with a signal generated by a servo read element positioned over the servo pattern. The pattern consists of alternating magnetic transitions at two different azimuthal slopes. Relative timing of pulses generated by the read element depends on the lateral position of the head. More specifically, the servo stripe illustrated in FIG. 2 has a series of magnetic transitions 200, 220 referred to as "stripes" 200, 220 that are recorded on the tape with alternate azimuthal slopes. Every other stripe 200 shown in FIG. 2 has a positive slope, while the intervening stripes 220 have negative slopes.

FIG. 2 shows the path and width of the servo head, indicated by reference numeral 240. The servo head reads a lateral width that is significantly less than the full lateral width of the stripes themselves. The signal generated by the servo head is represented by trace 260, illustrated directly below the illustrated magnetic transition stripes. As the servo head passes over the leading stripe edge, a positive pulse is developed and as the servo head passes over the trailing stripe edge, a negative pulse is created. Lateral position information can be derived by comparing the distances between pulses and groups of pulses. For example, a first distance A can be defined as the distance from a positive sloped stripe to the next negative sloped stripe, while a second distance B can be defined as the distance from a negative sloped stripe to the next positive sloped stripe. When the servo head is centered over the servo stripe, A will be equal to B: consecutive pulses will occur at equal intervals. In actual implementation, alternating "bursts" of stripes are used, with a burst being defined as one or more individual magnetic transition stripes.

FIG. 3 shows two sections of stripe bursts 310 used to position a servo read head 320. When the servo head 320 passes over the bursts of stripes 310, a series of pulses 330 are generated by the leading and trailing stripe edges. Ideally each pulse would possess a trapezoidal shape 340 with a rapid rise, a short horizontal peak 350 and a rapid linear descent followed by a short horizontal trough 360. In reality, each pulse resembles a waveform that is less than perfect with a shoulder 370 in some fashion as it crosses the baseline. There are many reasons for the imperfection including the inability to precisely and consistently create the stripes, the differing width in the bars and imperfections in the tape itself. Jitter and noise also blur the transition between each positive and negative pulse further reducing the ability to position the servo head accurately.

The accuracy of the transition time, that is the time from the leading edge of the stripe to the trailing edge, is determined by the narrowness of the pulses. The pulses 330 as shown in FIG. 3 are developed from the servo read head 320 and converted to digital pulses that switch on the pulse peaks. Traditionally, a filtering technique called "read equalization" has been used to reduce the impact of unwanted noise and jitter. Such a filter is frequency dependent such that higher and lower frequencies are attenuated differently. A schematic of a typical implementation of a read equalization circuit as used in a servo head reader is shown in FIG. 4. This circuit takes the raw servo signal 330 and amplifies it 440, AC couples 450 with an automatic gain control loop 460 and then applies a low-pass filter 410.

The filter 410 generates components of the original signal, the normal signal 420 and the differentiated signal 430 to accomplish pulse-slimming to narrow the pulses and make peak detection more precise.

Read equalization adds the derivative of the signal to the signal itself to accomplish pulse-slimming in the last stage of the filtering process. Mathematically this necessitates multiplying the signal by a linear constant and a complex frequency. The use of the wave form and a differentiated signal as is accomplished in read equalization increases the inaccuracy of true peak detection due to the presence of the shoulders in the original pulse.

To increase the accuracy of the positioning of a head reader in a tape system, it is desirable to narrow the pulses read by the servo head reader while simultaneously reducing baseline noise, jitter and distortion to increase the precision of peak detection. The present invention offers these and other advantages as is shown with reference to the following diagrams and described in the detailed description.

SUMMARY OF THE INVENTION

Briefly stated, the present invention involves systems and methods for slimming servo pulse signals in a servo tape system. A servo tape system employs the use of servo bars or stripes to position the read head accurately with respect to the tape. As is described in U.S. Pat. Nos. 5,689,384 and 6,912,104, servo stripes are placed on the tape at a varied angle so as to position the read head. As the tape travels by the head, the servo stripes cause the creation of a servo signal or pulse. The timing between the pulses as read by the head are used to accurately position the head vertically.

Noise and distortion of the servo pulse diminish the ability to precisely position the head. The present invention applies non-linear gain based on the amplitude of each pulse to reduce jitter and distortion of the pulse so as to more accurately position the read head. A non-linear gain device comprising multipliers, applies a non-linear gain to a normal servo pulse signal prior, in one embodiment, to the signal being applied to a qualifier. The non-linear gain device further comprises a limiter so as to limit the gain beyond a certain threshold to 1.0. The limitation of the gain to 1.0 renders the actual amplitude of the pulse unchanged while narrowing the pulse and flattening the baseline. The resulting pulse possesses less jitter and less distortion rendering the positioning of the read head more precise.

The foregoing and other features, utilities and advantages of the invention will be apparent from the following more particular description of an embodiment of the invention as illustrated in the accompanying drawings.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The present invention for non-linear pulse-slimming in a servo tape system is described in detail referring the aforementioned drawings. A non-linear gain is used to slim pulses read by a servo head reader as the head travels over servo stripes. As was previously discussed, servo stripes, or bars as they are sometime referred to, are used to accurately position read head on a servo tape system. The increasing capability to add more and more tracks on a single tape necessitates precise positioning of the read head. Positioning the read head precisely in a servo tape system is a function of the accurate reading and representation of servo stripes.

Figure 1:
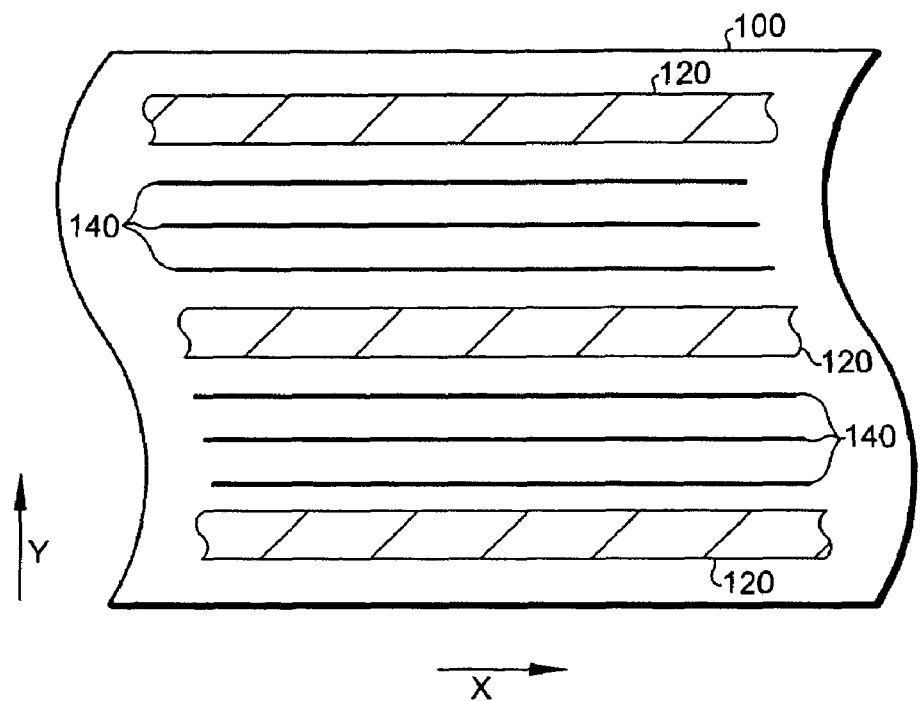
FIG. 1 shows a rendition of a segment of a linear tape extending in a longitudinal direction x with a series of servo stripes as is known in the art.
Figure 2:
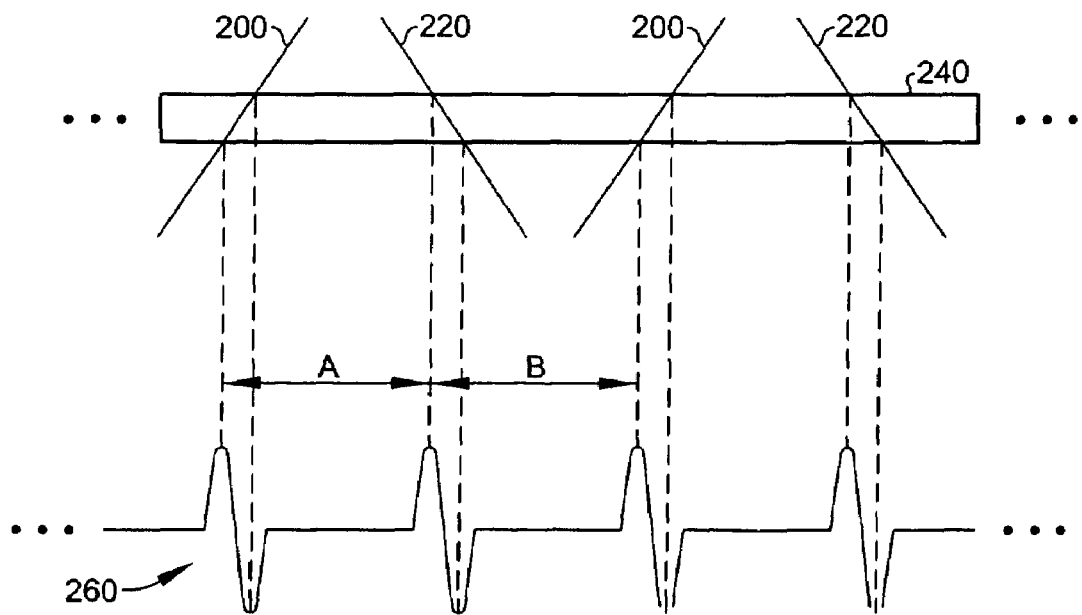
FIG. 2 shows a representation of pulses generated by servo stripes as read by a servo head reader as is known in the art.
Figure 3:
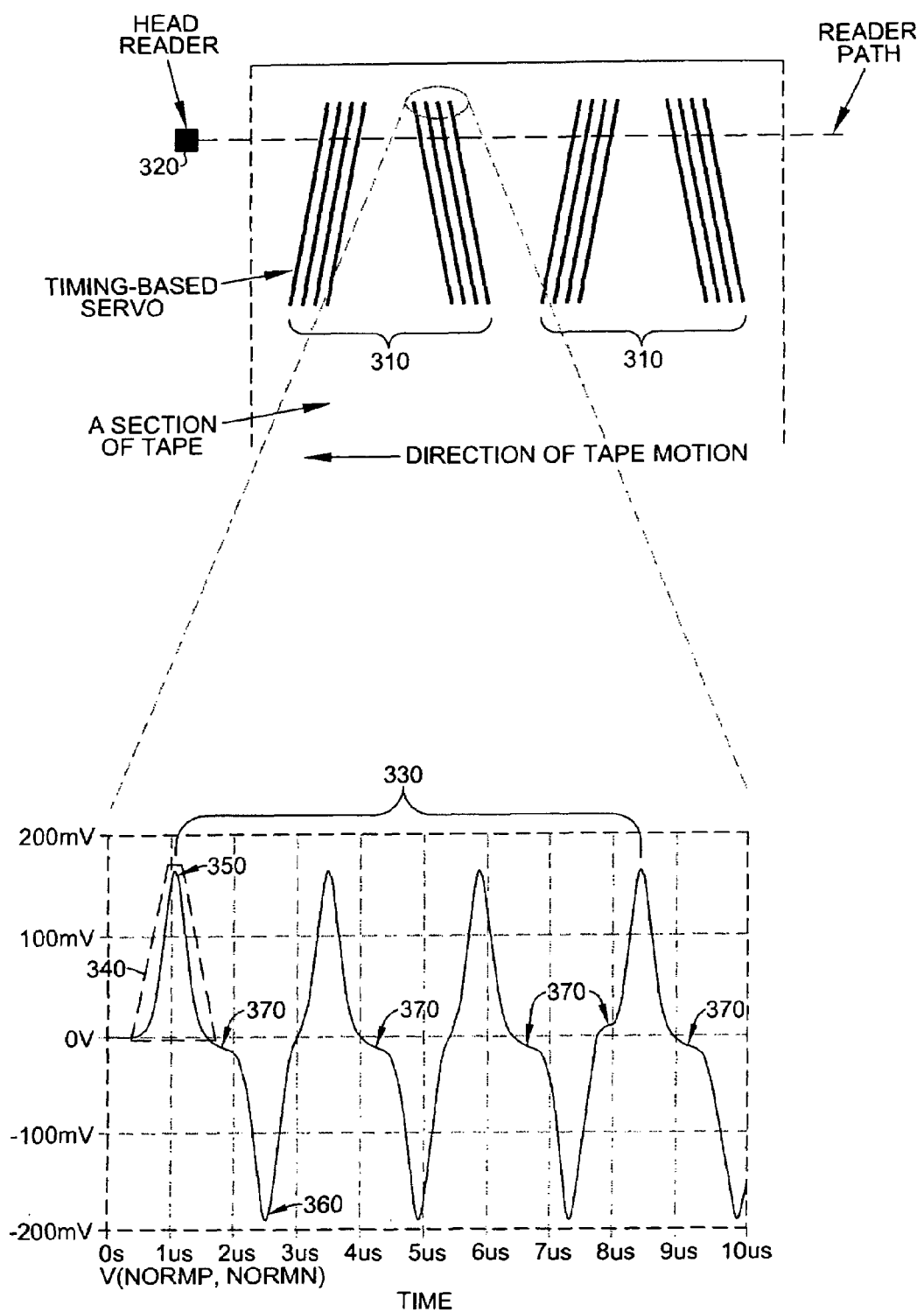
FIG. 3 shows a series of servo stripes grouped together to create a series of pulses as is known in the prior art.
Figure 4:
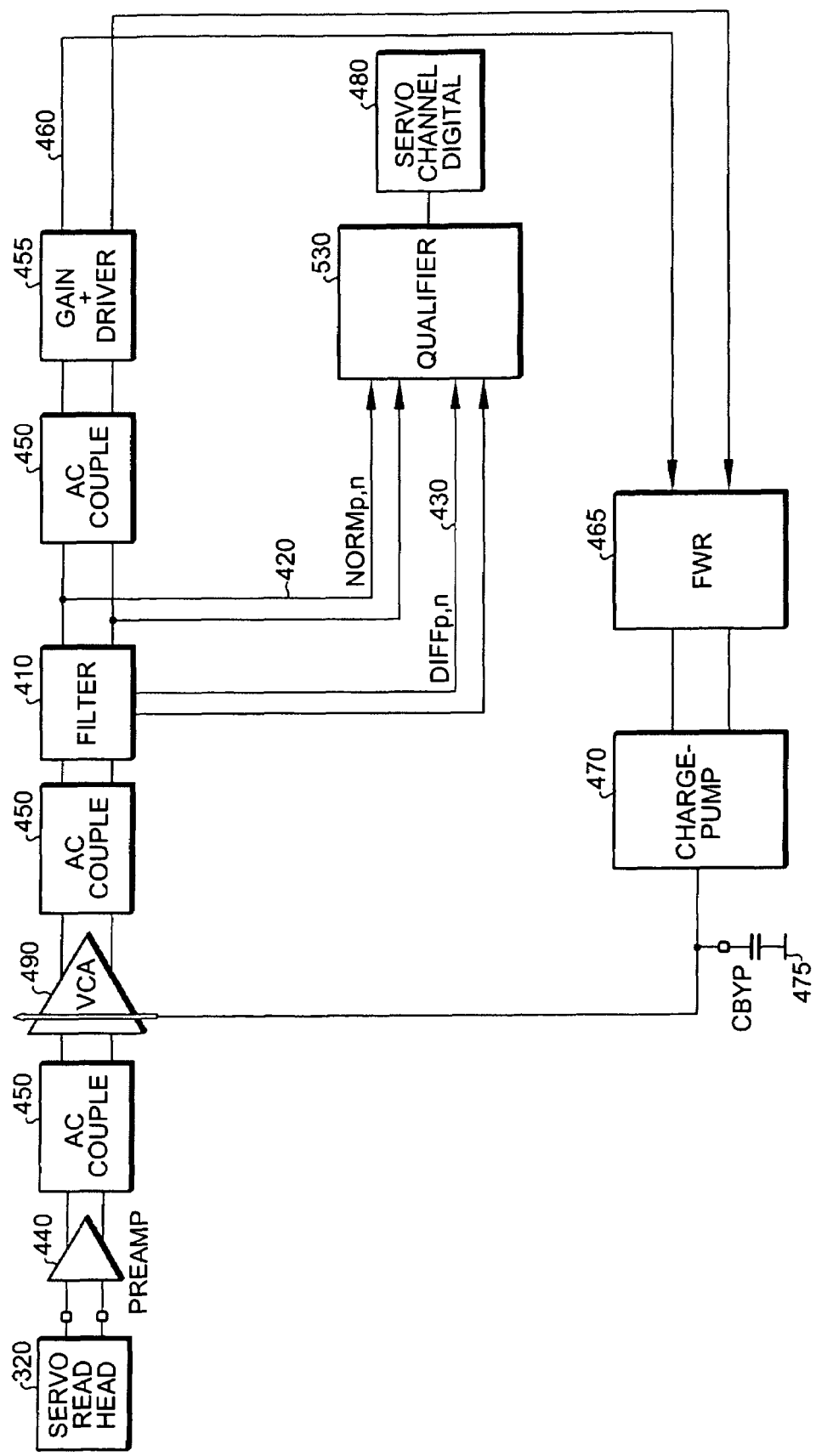
FIG. 4 is one rendition of a read equalization circuit as is known in the prior art.
Figure 5:
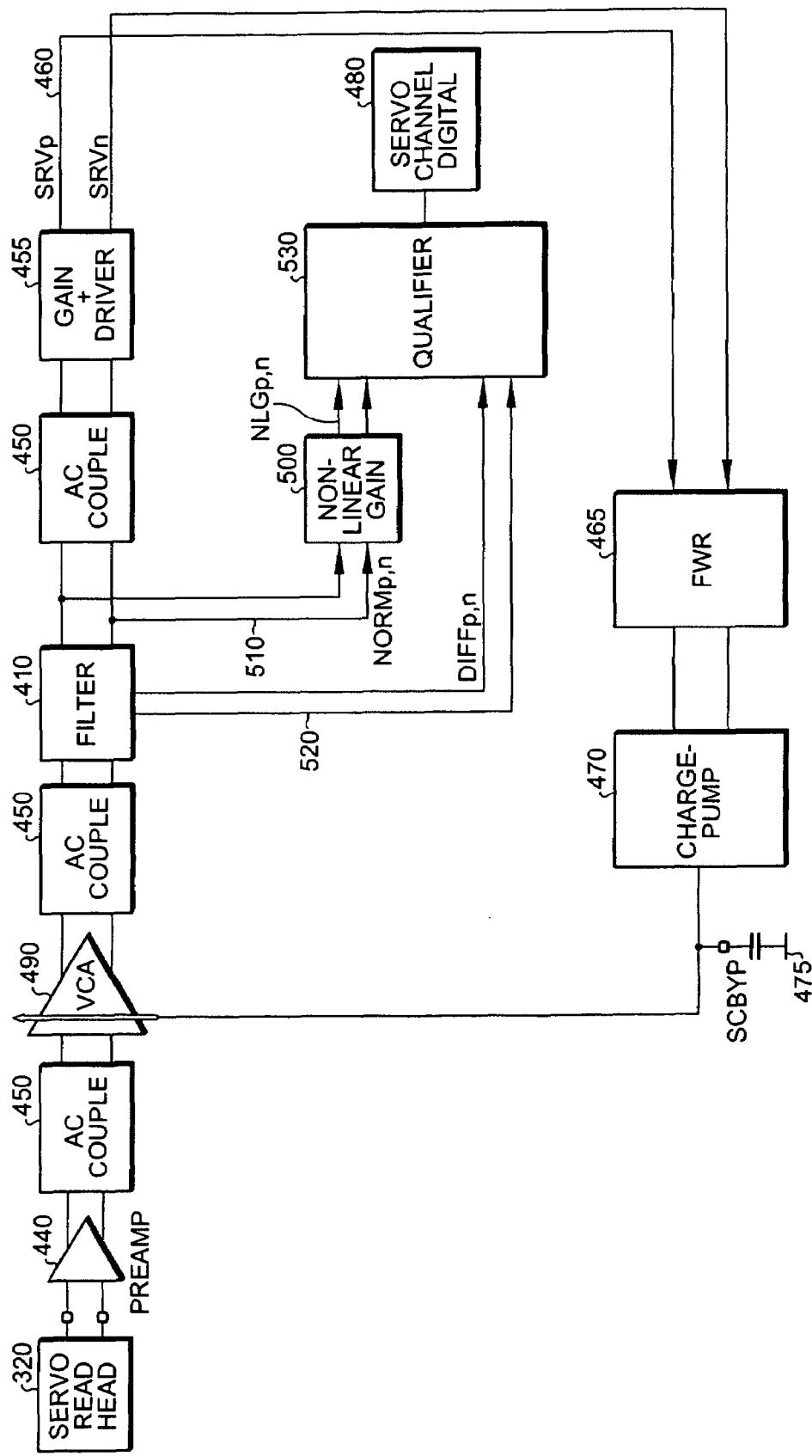
FIG. 5 is a servo channel circuit for non-linear pulse-slimming in a tape servo system according to one embodiment of the present invention.

FIG. 5 is one embodiment of several possible servo channel circuits according to the present invention for non-linear pulse-slimming in a tape servo system. A non-linear gain device 500 positioned so as to receive a normal servo signal 510 from the low pass filter 410, applies an appropriate gain based on signal amplitude, and delivers the modified signal to a qualifier 530. The qualifier 530 also receives from the filter 410 a differentiated signal 520 which the qualifier uses to create a digital servo signal. As will be appreciated by one skilled in the relevant art, a qualifier receives two inputs, a normal signal and a differentiated signal. These signals are typically generated by a filter however other means of signal producing leading to the same two types of signals is contemplated by and is equally consistent with the present invention. It will also be appreciated by one skilled in the relevant art, and as discussed below, that it is critically important in a servo tape system for the normal signal to be as clean as possible so as to prevent or minimize the qualifier from supplying incorrect or false signals.

The normal signal 510 is a normal filter output. The differentiated signal 520 is created so that the differential signal passes through zero each time the normal signal 510 has zero slope. Ideally, a differentiated signal 520 would lag the normal signal 510 by a 90 degree phase-shift. The zero crossings of the differentiated signal 520 correspond to the peaks of the normal signal 510. In a prior art implementation referred to as a "hysteresis qualifier", a digital signal is developed from normal signal 510 by comparing the amplitude of the normal signal to threshold levels. A second digital signal is created from the differentiated signal 520 by comparing the differentiated signal to its own baseline reference offset by small hysteresis levels (referred to in the prior art as a "zero-crossing detector). The two digital signals are connected to a D-Flip-Flop (DFF), with the normal digital signal connected to the D input and the differentiated digital signal connected as the clock. In this way, the digital representation of the normal signal is sampled by the effective zero-crossing of the differentiated signal. Other types of qualifiers may also be used to convert the normal signal to a digital form. The need for slimming the normal signal will be appreciated by one skilled in the art as the shoulders present in a normal unmodified signal may produce unwanted and inaccurate clock pulses. The qualifier uses these clock signals to read DFF data produced by the normal signal. The clocks do not directly sample the normal signal but instead sample the data signal generated by the normal signal that is digital.

There are large margins between the clock and data transition. If there were no circuit delays and the differential signal was shifted 90 degrees from the normal signal then there would be 90 degrees of phase margin between the rising edges of the data and the clock. There is also a large margin between false clock pulses and the data transition. False clock pulses are created by the shouldering of the input signal (dipping of the differential signal due to the flattening of the normal signal). The qualifier may fail (give an incorrect state) when one of the clocks has to be shifted beyond the aforementioned margins.

Figure 6:
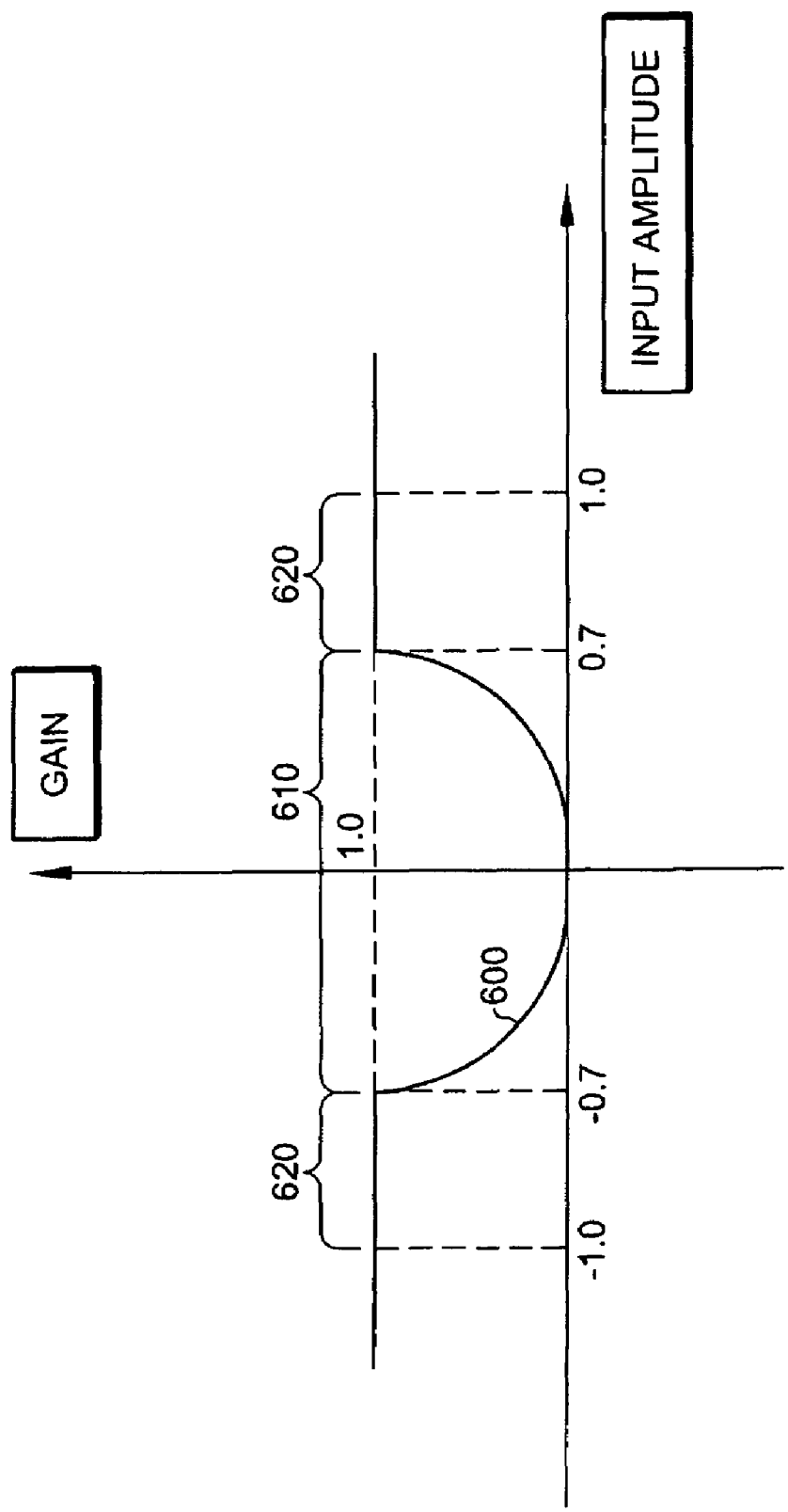
FIG. 6 is a graph showing one embodiment of a non-linear relationship between input amplitude and gain.

The application of the non-linear gain as shown in FIG. 5 slims the pulses associated with the normal signal 510 as well as reduces the shouldering effect discussed above. FIG. 6 is a graph showing one embodiment of a non-linear relationship between input amplitude and gain as may be employed by a non-linear gain device consistent with the present invention. To slim the pulses without altering the amplitude of the pulse, a non-linear gain 600 is applied to the pulse between, in one embodiment, a pulse amplitude range 610 of −0.7 and 0.7. Beyond the −0.7 and 0.7 boundaries 620, the gain is limited to 1.0 thus leaving the actual peak amplitude of the pulse intact. Although the invention has been described and illustrated with a certain degree of particularity, it is understood that the present disclosure has been made only by way of example, and that numerous changes in the combination and arrangement of parts and values such as the boundary of the gain being place at ±0.7 can be altered by those skilled in the art without departing from the spirit and scope of the invention. The graph depicted in FIG. 6 shows a $4^{th}$ order non-linear gain 610 between the boundaries of 0.0 and ±0.7 amplitude wherein the gain varies from zero to 1.0. While in most situations this value is sufficient to maintain the actual peak while narrowing the pulses, other values may be implemented without departing from the scope of the invention.

Figure 7:
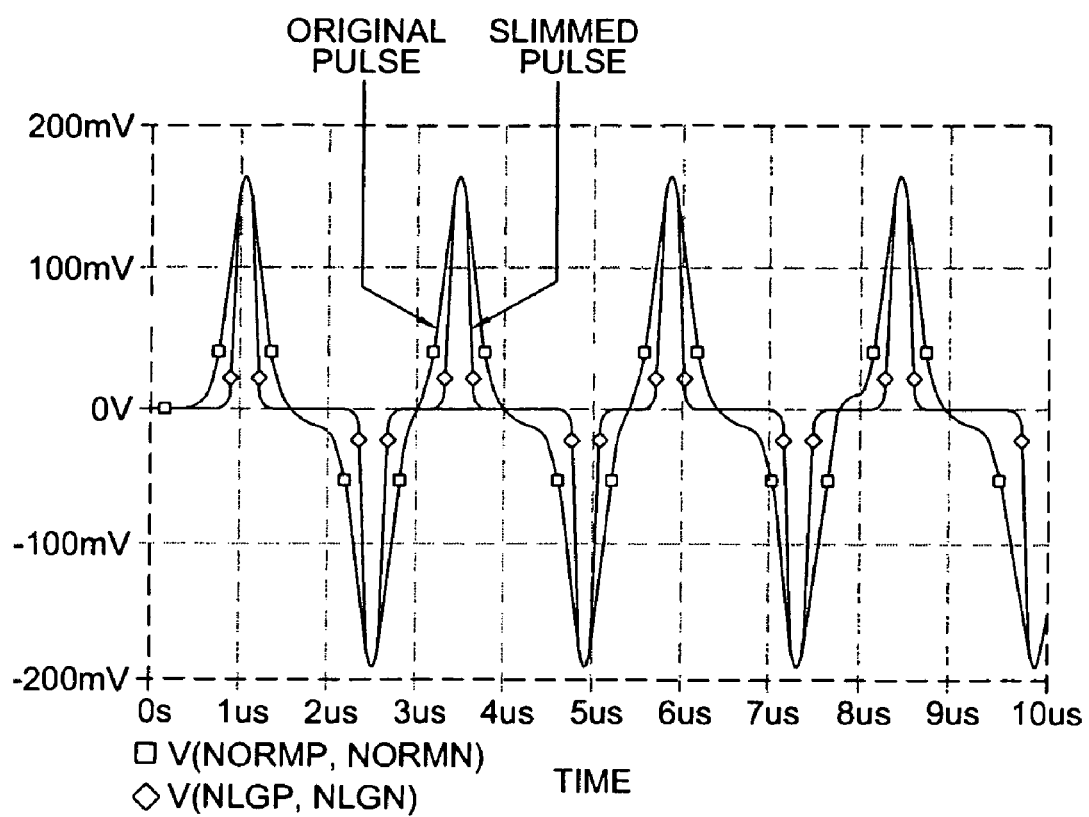
FIG. 7 is a representation of the effects of using a non-linear pulse-slimming technique according to various embodiments of the present invention.

FIG. 7 is a representation of the effects of using a non-linear pulse-slimming technique according to various embodiments of the present invention. The results of such a non-linear gain is to decrease the jitter of the peaks either forward or backward or up and down by having a zero gain at the baseline. Linear techniques do not provide such a reduction in noise and jitter. As is shown in FIG. 7, the baseline (shown as 0 volts in FIG. 7) flattens and the peaks narrow with respect to time. The amplitude based non-linear gain of the present invention is a significant improvement over the frequency-based linear gain applied in most equalization circuits. Note that the shouldering of the original pulse is eliminated by the non-linear gain.

Figure 8:
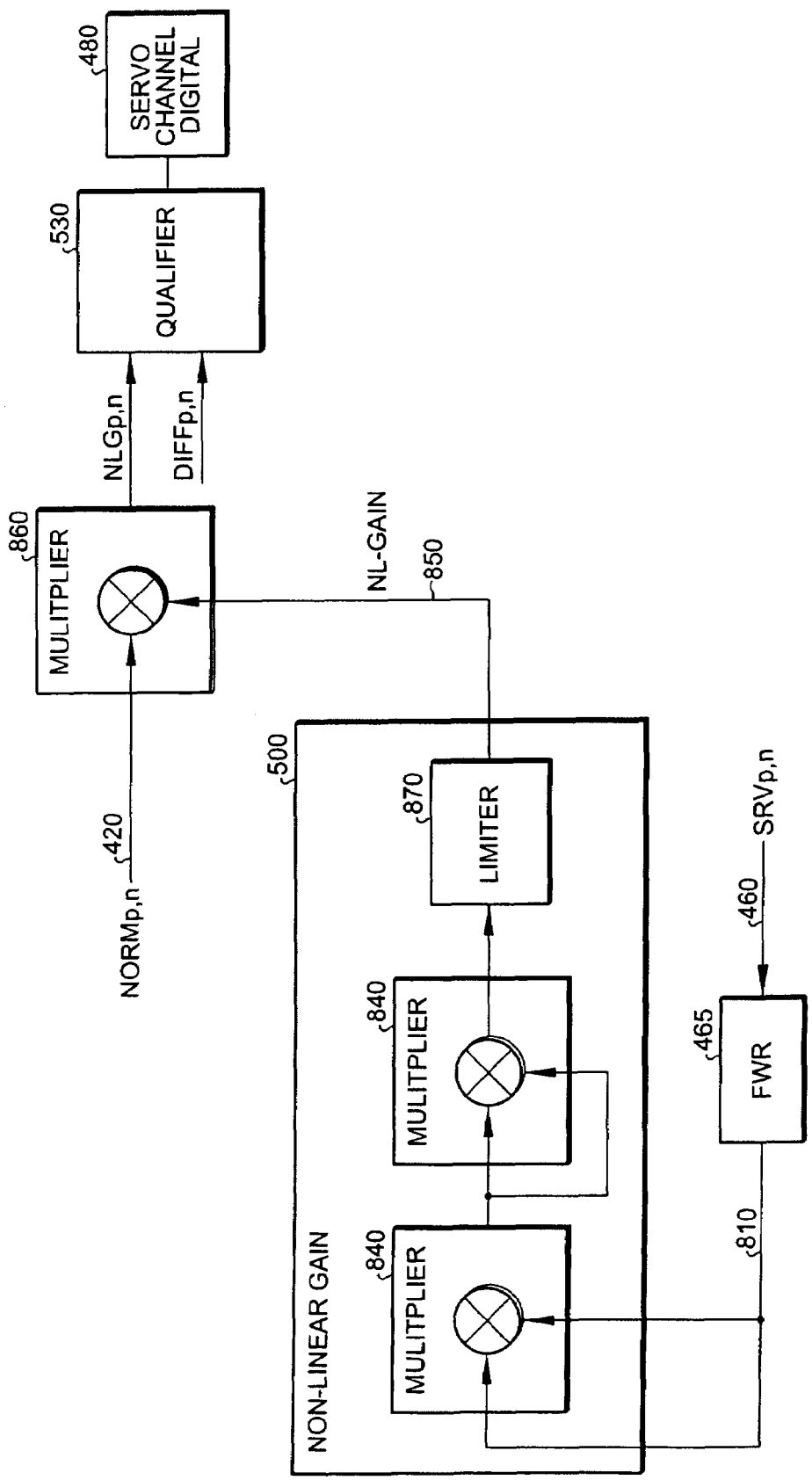
FIG. 8 is a high level block diagram of a non-linear gain device for non-linear pulse-slimming in a tape servo system according to one embodiment of the present invention.

FIG. 8 is a high level block diagram of a non-linear gain device 500 for non-linear pulse-slimming in a tape servo system according to one embodiment of the present invention. In the embodiment shown in FIG. 8, the non-linear gain device receives a servo channel signal 810 from a full wave rectifier 465. A series of multipliers 840 is thereafter applied to the servo channel signal 810 to produce a gain. The device illustrated in FIG. 8 comprises two multipliers which in this embodiment creates a gain of the $4^{th}$ degree. Other multipliers or combination of multipliers can be used to create a gain of any degree. Indeed in other embodiments of the present invention multiplication may be implemented using logarithmic/anti-logarithmic methods. The gain, however implemented, thereafter multiplies 860 the non-linear gain signal and the normal signal 420 to develop the normal signal's arrival at the qualifier 530. Interposed between the multipliers 840 of the non-linear gain device 500 and the multiplier 860 which multiplies the gain and the normal signal 420, is a limiter 870. The limiter 870 bounds the gain to a predetermined amplitude value so as to render peak amplitude of the normal signal unchanged.

Figure 9:
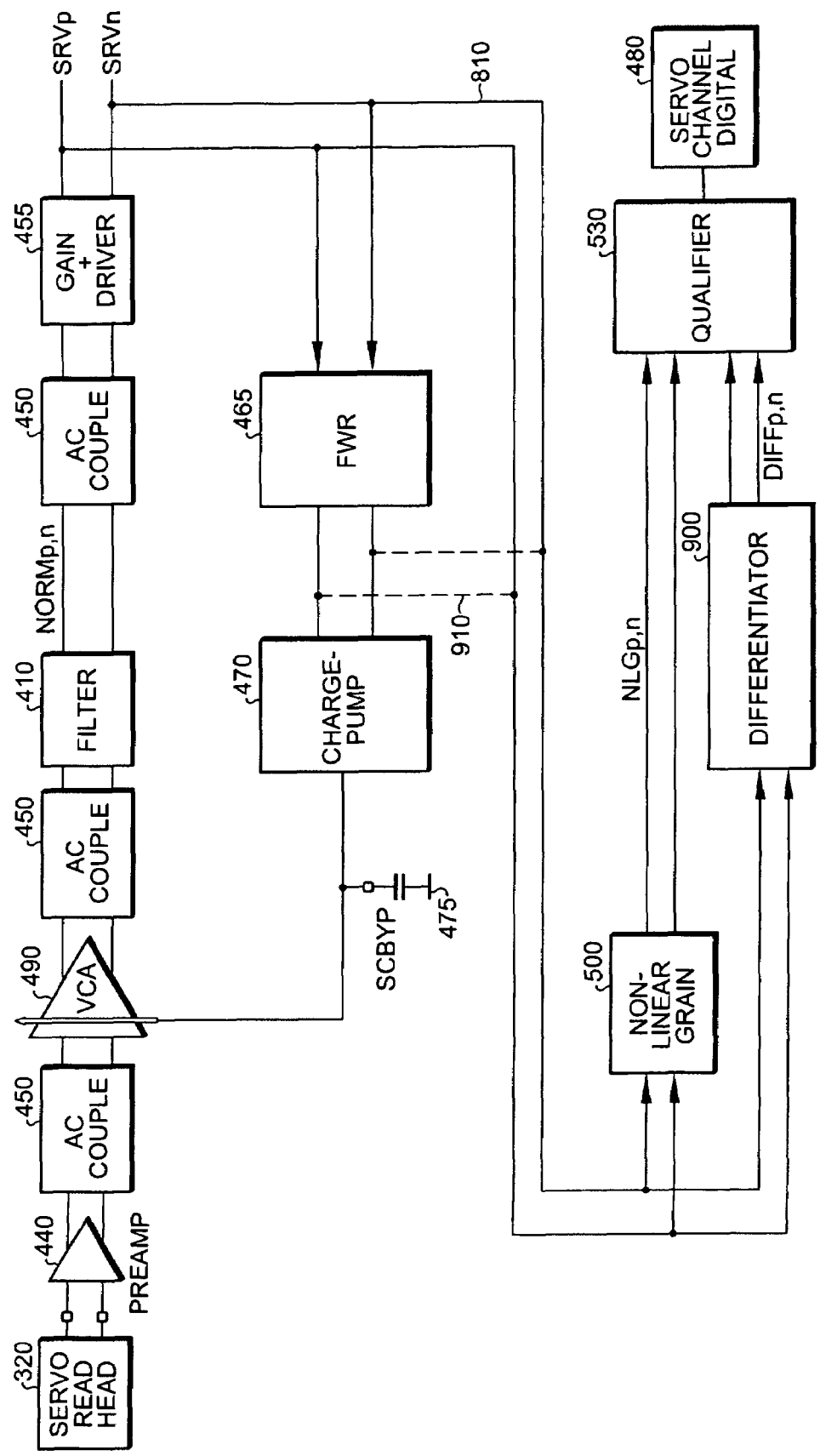
FIG. 9 is a servo channel circuit diagram according to one embodiment of the present invention for non-linear pulse-slimming in a tape servo system comprising a non-linear gain device and a differentiator.

FIG. 9 is a servo channel circuit diagram according to one embodiment of the present invention for non-linear pulse-slimming in a tape servo system comprising a non-linear gain device and a differentiator. FIG. 9 depicts the implementation of the non-linear gain device 500 in conjunction with a differentiator 900 rather than using the differentiated signal from the low pass filter 410. In this embodiment, the signal is taken downstream of the gain and driver 455. The servo channel signal 810 is, therefore, applied to both the non-linear gain device 500 and the differentiator 900. In an alternate embodiment of the present invention, the servo channel signal 810 is applied to the full wave rectifier 465 and then supplied to the non-linear gain device 500, (as shown with dashed lines 910), rather than coming directly from the gain and driver 455.

Figure 10:
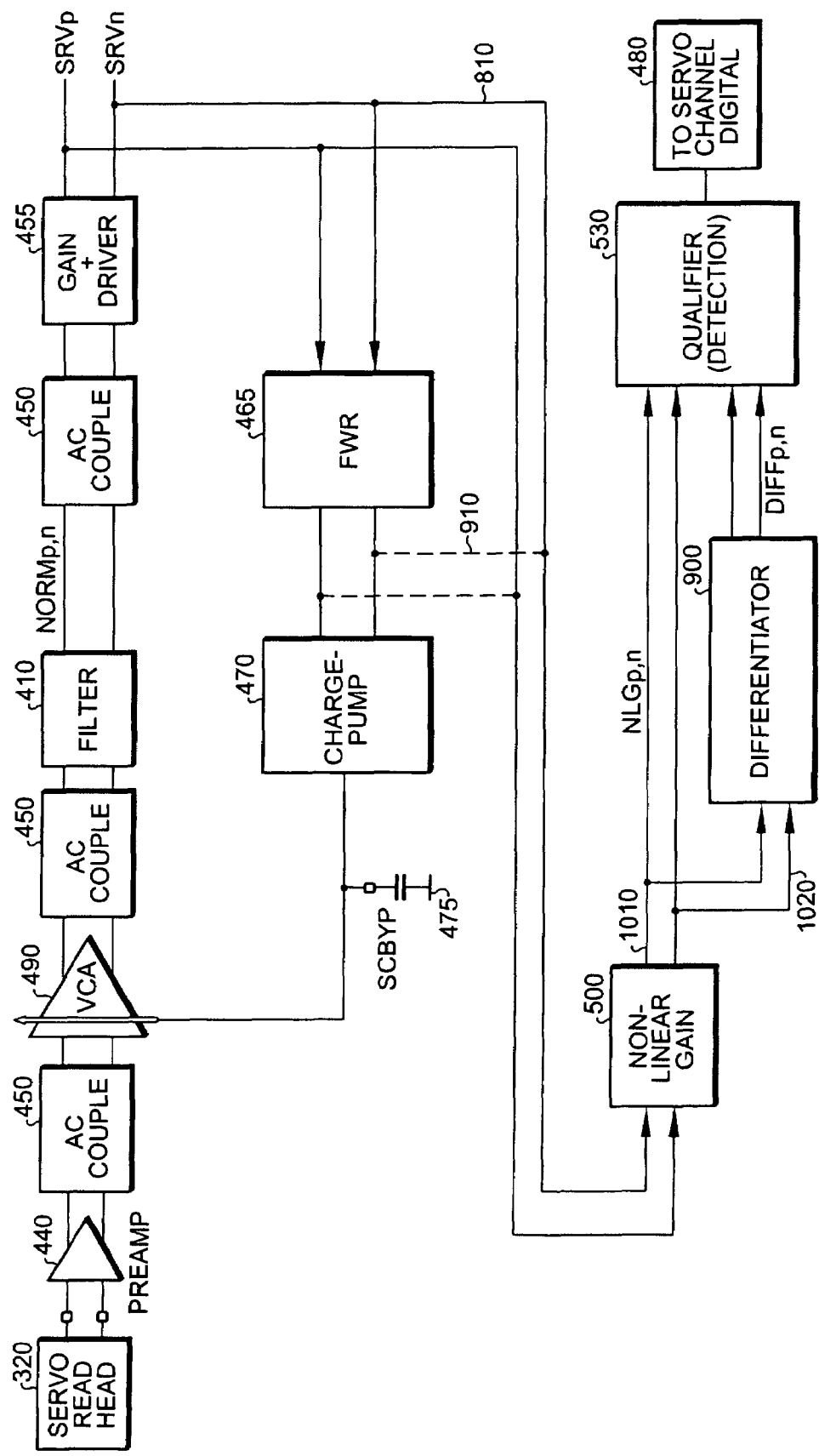
FIG. 10 is a servo channel circuit diagram according to another embodiment of the present invention for non-linear pulse-slimming in a tape servo system comprising a non-linear gain device and a differentiator.

Another version of the implementation of the non-linear gain device 500 is shown in FIG. 10. FIG. 10 is a servo channel circuit diagram wherein the output 1010 of the non-linear device 500 provides the input 1020 of the differentiator 900. The slimmed pulse, as a result of the application of the non-linear gain, provides to the differentiator 900 a cleaned signal producing a differentiated signal that would be zero at the baseline. The rippling associated with the shouldering of the normal signal would be either eliminated or significantly reduced. Because of the non-linear gain 500, the signal 1010 being input into the differentiator, does not have the ripple at the baseline resulting in a differentiator output that is not distorted. So when the differentiator 900 output is compared to the qualifier hysteresis levels, the errors associated with the baseline ripple are greatly reduced, ultimately producing a much more accurate clock as it is processed by the qualifier 530.

Figure 11:
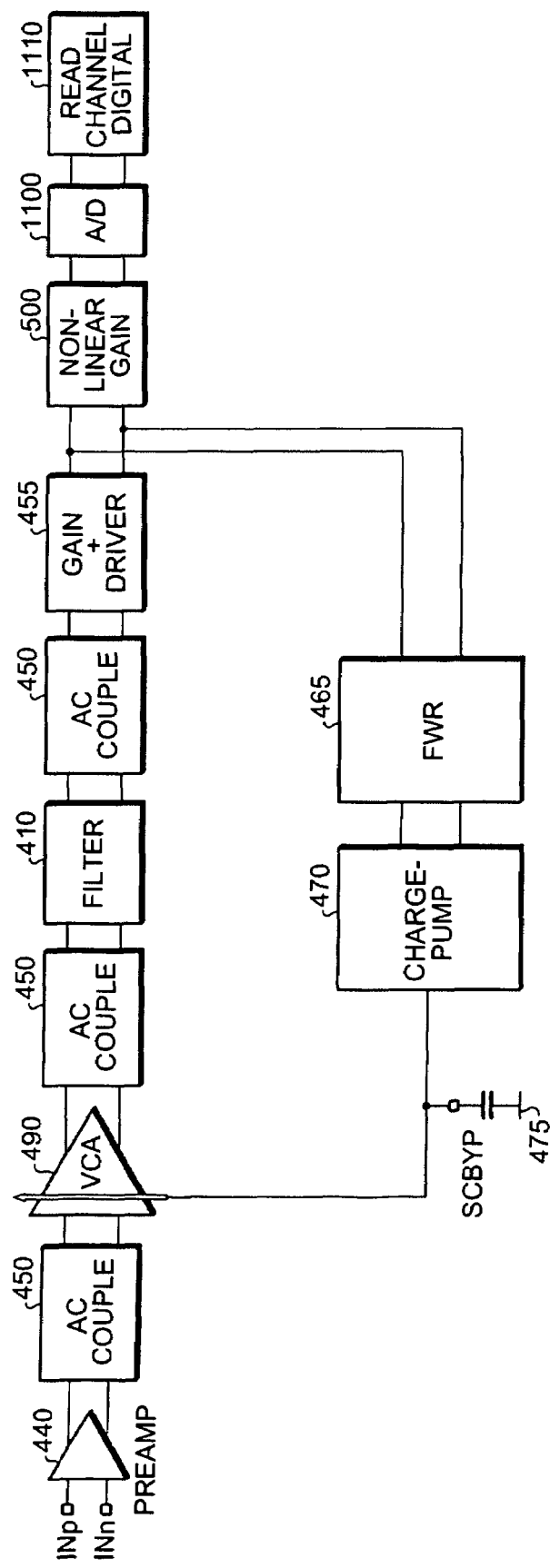
FIG. 11 is a read channel circuit diagram according to one embodiment of the present invention for non-linear pulse-slimming in a tape servo system.
Figure 12:
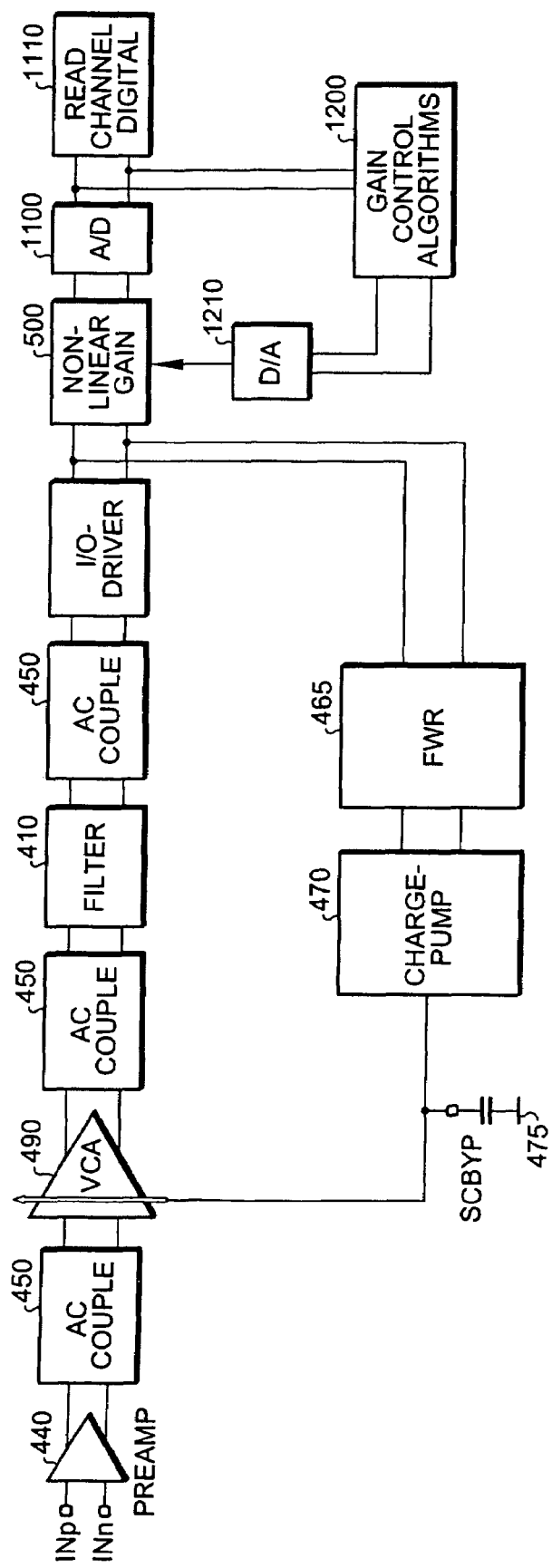
FIG. 12 is a read channel circuit diagram according to another embodiment of the present invention for non-linear pulse-slimming in a tape servo system.

FIGS. 11 and 12 show read channel circuit diagrams according to embodiments of the present invention for non-linear pulse-slimming in a tape servo system. Applying a non-linear gain to the read channel can also be done before (as shown in FIG. 11) or after (not shown) the analog to digital conversion of the signal. Such an application does not require the use of a differentiated signal. The non-linear gain device 500 can also be positioned, as shown in FIG. 12, to receive signals from other digital gain algorithms 1200. In that embodiment of the present invention, the non-linear gain device 500 applies a gain to the normal signal prior to analog to digital conversion. Digital gain control algorithms 1200 are applied to the digital signals which are then converted back to analog signals via a digital to analog device 1210. The modified analog signal is then fed back through the non-linear gain device 500 until the process yields a desired digital read channel.

Figure 13:
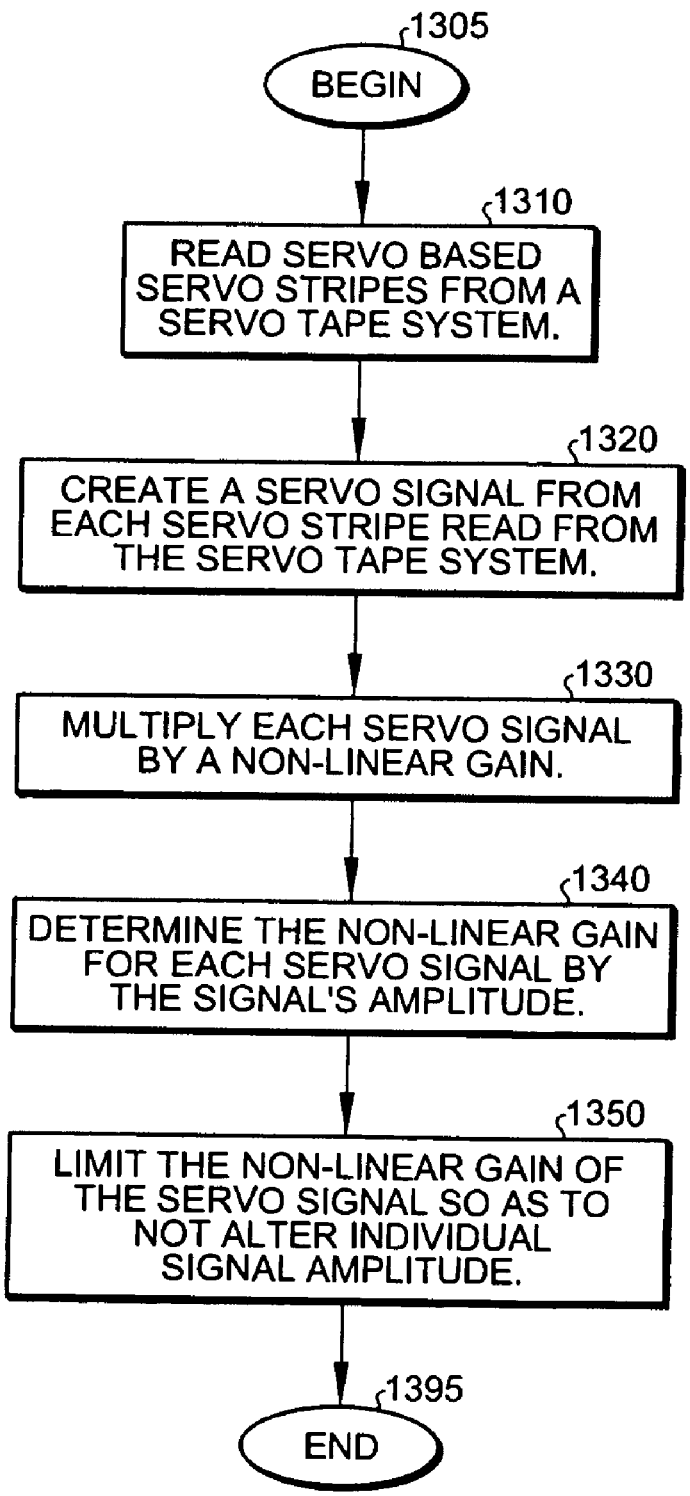
FIG. 13 is a high level flow diagram for one embodiment of the present invention for applying a non-linear gain for pulse-slimming in a servo tape system.

The operation of a non-linear gain to slim pulses in a servo tape system is depicted in FIG. 13. A servo head reads 1310 one or more servo stripes on tape of a servo tape system. As previously discussed, the servo stripes may be individually positioned or may be grouped. From the reading of the stripes, a servo signal is created 1320 wherein the leading edge of the stripe creates a positive pulse followed by a negative pulse from the trailing edge of the stripe. Groups of stripes accordingly produces bursts of signals/pulse corresponding to each stripe or group of stripes.

Once the signal has been created by reading the stripes, a non-linear gain device 500 multiplies 1330 each servo signal by a non-linear gain. The non-linear gain is based on the amplitude 1340 of the pulse and not the pulse frequency. Thus a gain is individually determined and applied for each pulse. While the determination of the non-linear gain may vary depending on each particular application of the non-linear gain device 500, one embodiment of the present invention uses a 4th order non-linear gain based on pulse amplitude. The non-linear gain device 500 also limits 1350 the application of the gain to each pulse so as not to alter the amplitude of the peak of each pulse while still providing a slimming effect of the pulse and a flattening effect of the baseline.

As will be understood by those familiar with the art, the invention may be embodied in other specific forms without departing from the spirit or essential characteristics thereof. Likewise, the particular naming and division of the modules, devices, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, devices, managers, functions, systems, engines, layers, features, attributes, methodologies and other aspects of the invention can be implemented as software, hardware, firmware or any combination of the three. Accordingly, the disclosure of the present invention is intended to be illustrative, but not limiting, of the scope of the invention, which is set forth in the following claims.

We claim:

1. A method for non-linear pulse-slimming in a tape servo system, the method comprising:
    reading servo stripes of a linear tape system wherein reading each servo stripe creates a servo signal and wherein each servo signal has a peak as measured from a baseline;
    filtering each servo signal using a low-pass filter creating a normal servo signal and a differentiated servo signal; and
    multiplying each servo signal by a non-linear gain to slim each servo signal prior to being sent to a qualifier, wherein the non-linear gain is determined from servo signal amplitude.

2. The method of claim 1, wherein the non-linear gain comprises raising each servo signal to a multiplicative power and limiting the non-linear gain above a preset input amplitude to a constant gain.

3. The method of claim 1, wherein the non-linear gain increases in value from the baseline to the peak.

4. The method of claim 1, wherein the non-linear gain is limited so as to not alter peak amplitude.

5. The method of claim 1, wherein the non-linear gain is applied to the normal servo signal prior to being sent to the qualifier.

6. The method of claim 1, wherein the non-linear gain is applied to each servo signal prior to being sent to the qualifier.

7. The method of claim 6, wherein the qualifier further receives a differentiated servo signal from a differentiator that has not been altered by the non-linear gain.

8. The method of claim 1, wherein the non-linear gain is applied to each servo signal prior to each servo signal being sent to the qualifier and prior to each servo signal being sent to a differentiator, the differentiator sending a differentiated non-linear gained signal to the qualifier.

9. The method of claim 1, wherein non-linear gain is applied to each servo signal subsequent to an analog-to-digital conversion of each servo signal.

10. The method of claim 1, wherein non-linear gain is applied immediately prior to analog-to-digital conversion of each servo signal.

11. A system for non-linear pulse-slimming in a tape servo system, the system comprising:
    a linear tape system having servo stripes for creating a normal servo signal when read by a servo reading head and wherein each normal servo signal has a peak as measured from a baseline;
    a low pass filter configured to pass through the normal servo signal and create a differentiated servo signal; and
    a non-linear gain device configured to receive each normal servo signal and multiply it by a non-linear gain based on servo signal amplitude to slim each servo signal prior to being sent to a qualifier.

12. The system of claim 11, wherein the non-linear gain device is configured to raise each normal servo signal to a multiplicative power and limit the non-linear gain above a preset input amplitude to a constant gain.

13. The system of claim 11, wherein the non-linear gain device is configured to increase the non-linear gain in value from the baseline to the peak.

14. The system of claim 11, wherein the non-linear gain device is configured to limit the non-linear gain so as to not alter the amplitude of the peak.

15. The system of claim 11, wherein the non-linear gain device is configured to apply the non-linear gain to the normal servo signal and combine it with the differentiated servo signal at the qualifier.

16. The system of claim 11, wherein the non-linear gain device is configured to apply the non-linear gain to each normal servo signal prior to being sent to the qualifier.

17. The system of claim 16, wherein the qualifier further receives a differentiated servo signal from a differentiator that has not been altered by the non-linear gain device.

18. The system of claim 11, wherein the non-linear gain device is configured to apply the non-linear gain to each normal servo signal prior to the normal servo signal being sent to the qualifier and prior to each normal servo signal being sent to a differentiator, the differentiator then sending a differentiated non-linear-gained signal to the qualifier.

19. The system of claim 11, wherein the non-linear gain device is configured to apply the non-linear gain to the normal servo signal subsequent to an analog-to-digital conversion of the normal servo signal.

20. The system of claim 11, wherein the non-linear gain is configured to apply the non-linear gain immediately prior to analog-to-digital conversion of the normal servo signal.

* * * * *